(12) United States Patent
Tsukada et al.

(10) Patent No.: US 6,841,028 B2
(45) Date of Patent: Jan. 11, 2005

(54) FILM JOINING METHOD, A WIDE FILM PRODUCED BY THE JOINING METHOD AND A COVERING MATERIAL FOR AGRICULTURAL USE MADE OF THE WIDE FILM

(75) Inventors: Tetsuro Tsukada, Ibaraki (JP); Tutomu Fusyuku, Chiba (JP)

(73) Assignee: Asahi Glass Company, Limited, Tokyo (JP)

(*) Notice: Subject to any disclaimer, the term of this patent is extended or adjusted under 35 U.S.C. 154(b) by 3 days.

(21) Appl. No.: 10/316,091

(22) Filed: Dec. 11, 2002

(65) Prior Publication Data

US 2003/0113502 A1 Jun. 19, 2003

(30) Foreign Application Priority Data

Dec. 14, 2001 (JP) .................................... 2001-381167
Feb. 19, 2002 (JP) .................................... 2002-041770
Oct. 31, 2002 (JP) .................................... 2002-318203

(51) Int. Cl.$^7$ ............................. B32B 3/06; B32B 31/20
(52) U.S. Cl. ............................ 156/304.6; 156/304.1; 156/304.3; 428/58
(58) Field of Search ............................ 156/157, 304.1, 156/304.3, 304.6; 428/57, 58

(56) References Cited

U.S. PATENT DOCUMENTS 4,269,647 A * 5/1981 Verkinderen et al. ....... 156/157

FOREIGN PATENT DOCUMENTS

| JP | 58-028326 | 2/1983 | |
| JP | 60-125637 | 7/1985 | |
| JP | 62227724 A | * 10/1987 | ........... B29C/65/04 |
| JP | 63-122522 | 5/1988 | |

* cited by examiner

*Primary Examiner*—Sue A. Purvis
(74) *Attorney, Agent, or Firm*—Oblon, Spivak, McClelland, Maier & Neustadt, P.C.

(57) ABSTRACT

A method for joining films having a hydrophilized surface at a single surface and an excellent melt-bonding force at the melt-bonded portion, which is formed by disposing two films (A) having a hydrophilized surface at a single surface, to align the hydrophilized surfaces so as to butt each end portion; overlaying a film (B) on a side of non-hydrophilized surface of the films (A), so as to bridge the butting portion, and hot-pressing the overlapping portion (c1)5 to join the two films (A). A wide film obtained by the above-mentioned method is suitable for a covering material for agricultural use.

20 Claims, 5 Drawing Sheets

FILM JOINING METHOD, A WIDE FILM PRODUCED BY THE JOINING METHOD AND A COVERING MATERIAL FOR AGRICULTURAL USE MADE OF THE WIDE FILM

The present invention relates to a film joining method, a wide film produced by the joining method and a covering material for agricultural use made of the wide film.

A wide film is generally used as a covering material for agricultural use. A film produced in an industrial scale, such as a vinyl chloride film for agricultural use (hereinbelow, referred to as the agricultural film) has a width of from 1 to 4 m. Such film is insufficient for the covering material for agricultural use because of its width. Accordingly, a film having a larger width obtained by joining these films is used as a covering material for agricultural use. As film joining methods for these films, a joining method that two films are overlapped at their one end portion and the overlapping portion is hot-pressed is adopted.

Even in a case of using a fluororesin film made of fluororesin such as an ethylene/tetrafluoroethylene copolymer (hereinbelow, referred to as ETFE), or a polyolefin film composed of polyolefin such as polyethylene or an ethylene/vinyl acetate copolymer, wherein the film does not have a hydrophilized surface, the joining method that two films are overlapped at each end portion and the overlapped portion is hot-pressed can be adopted in the same manner as the agricultural film.

However, when a film without having a hydrophilized surface is used for setting-up an agricultural house or the like, the light permeability of the film tends to decrease due to water drops resulted from water condensation at an inner side of the set-up film or to prevent the growth of crops because the water drops fall on the crops from the film. The above-mentioned problem is generally solved by conducting hydrophilization to the film used as the covering material for agricultural use so as to provide an anti-drop property to the film.

As the agricultural film, a film formed by shaping polyvinyl chloride in which a hydrophilization agent is mixed is generally used so that a hydrophilization effect can be presented. With the film containing the hydrophilization agent, a wide film can be formed easily by overlapping each end part of the films and hot-pressing the overlapping portion so that the overlapping portion is melt-bonded.

In a case of using the fluororesin, a method for mixing a hydrophilization agent cannot be adopted because the decomposition of an industrially available hydrophilization agent is caused since the fluororesin has a high molding temperature. Accordingly, a hydrophilization method wherein a hydrophilic substance is coated on a surface of the fluororesin film is adopted. In such fluororesin film having a hydrophilized surface, however, an overlapping portion cannot be melt-bonded sufficiently when the films are laid to overlap each other and the overlapping portion is hot-pressed to bond the films, because of the presence of the hydrophilized surface.

As methods for solving the above-mentioned problems, there is a method that when a surface of a film is subjected to hydrophilization, an end portion including its neighboring portion is masked to form a portion where the hydrophilic substance is not applied; this portion is overlapped with a non-hydrophilized surface, and the overlapping portion is hot-pressed for melt-bonding.

However, this method has a complicated manufacturing process because a masking step is additional whereby an increased cost is caused in order to form the wide film.

It is an object of the present invention to provide a method for joining films (A) having a hydrophilized surface at their single surface.

It is another object of the present invention to provide a wide film obtained by repeating the above-mentioned method at least once and a covering method for agricultural use formed by using the wide film.

In accordance with the present invention, there is provided a film joining method which comprises disposing two films (A) having a hydrophilized surface at their single surface to align the hydrophilized surfaces so as to butt each one end portion; overlaying a film (B) on a side of non-hydrophilized surface of the films (A) so as to bridge the butting portion, and hot-pressing the overlapping portion (c1) to join the two films (A).

Further, the present invention is to provide a wide film having a width of 1 to 150 m formed by joining at least two films (A) which is characterized by repeating at least once the above-mentioned joining method, and a covering material formed by using the wide film.

Figure 1:
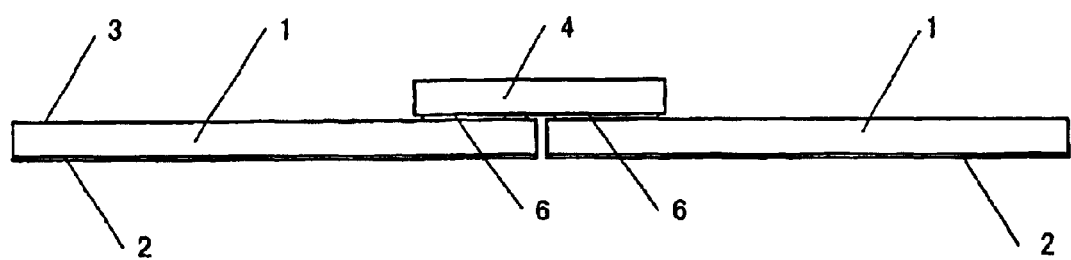
FIG. 1 (FIG. 1) is a diagrammatical view in cross section of films (A), each denoted as component 1 in this figure, and a film (B), denoted as component 4 in this figure, joined by the film joining method of the present invention.

Preferred embodiments of the film joining method of the present invention will be described with reference to the drawing.

FIG. 1 is a diagrammatical cross-sectional view of films (A), each denoted as component 1, having a hydrophilized surface at their single surface. Films (A) and a film (B), denoted as component 4, are melt-bonded at a melt-bonding portion 6 on a side of non-hydrophilized surface of the films (A), whereby two films (A) are joined by the aid of the film (B), in this specification, "join" means connection by melt-bonding.

Figure 2:
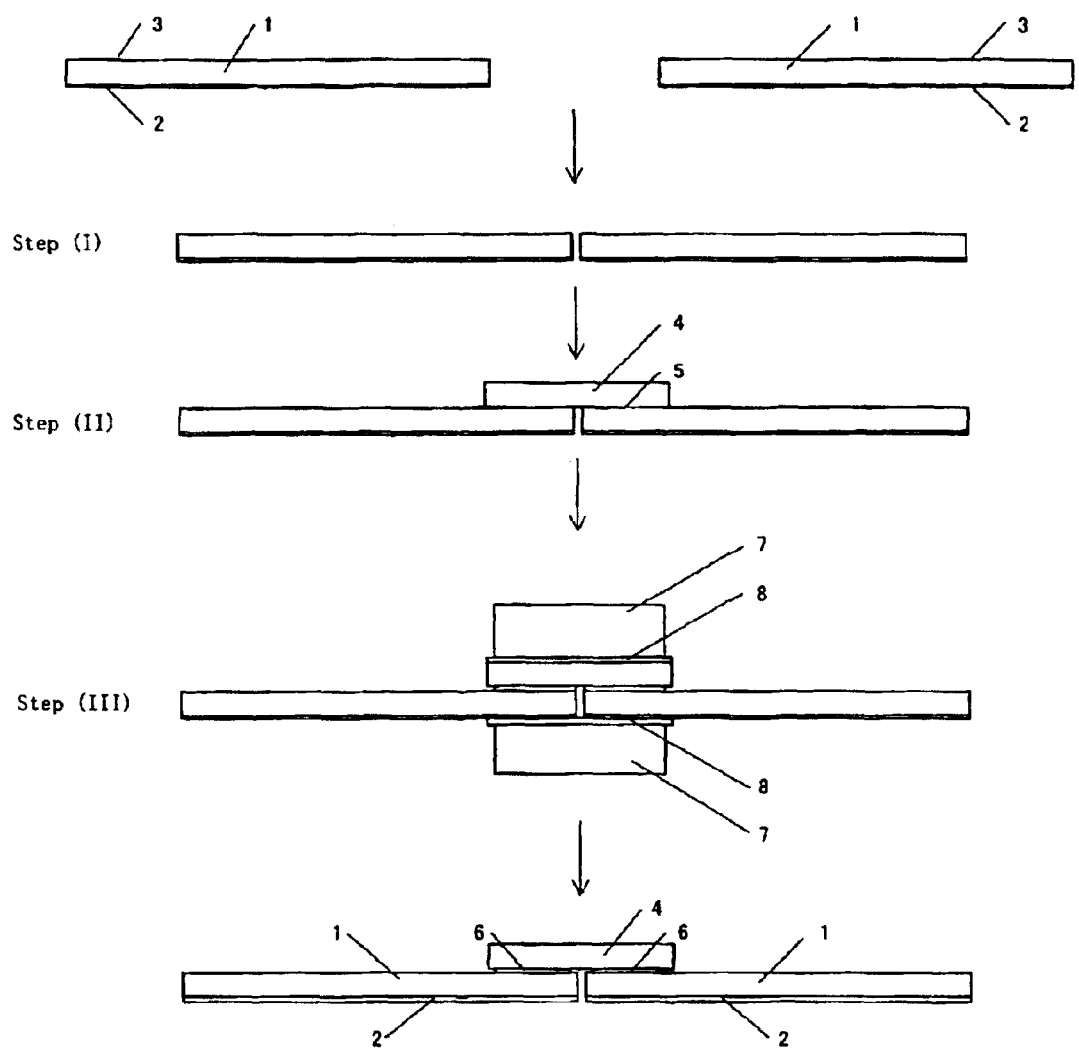
FIG. 2 (FIG. 2) is a diagram showing an example of the process for joining films (A), each denoted as component 1 in this figure, according to the film joining method of the present invention.

An example of a joining step for the films (A), each denoted as component 1 in FIG. 2, is shown in FIG. 2. In Step (I), two films (A) having a hydrophilized surface 2 at their single surface are disposed to align the hydrophilized surfaces so as to butt each one end portion. Then, in Step (II), film (B), denoted as component 4, is overlaid on each end part of the films (A) on a side of non-hydrophilized surface 3 formed on the films, so as to bridge the butting portion to thereby form an overlapping portion (c1)5, denoted as component 5 in FIG. 2. In Step (III), the overlapping portion (c1)5 is hot-pressed with upper and lower heaters 7 of a hot-pressing machine, whereby a melt-bonded portion 6 is formed, and the two films (A) are connected by the aid of the film (B).

In Step (III), releasing sheets 8 are preferably used in order to prevent the adhesion of the films (A) and the film (B) to the upper and lower heaters 7 of the hot-pressing machine. Further, the opposed end portions of the two films (A) may be butted each other or may not be in mutual contact so as to have a gap between the films (A). When there is a gap, the distance is preferably from 0.01 to 88 mm, more preferably, from 0.05 to 50 mm, most preferably, from 0.1 to 30 mm.

Figure 3:
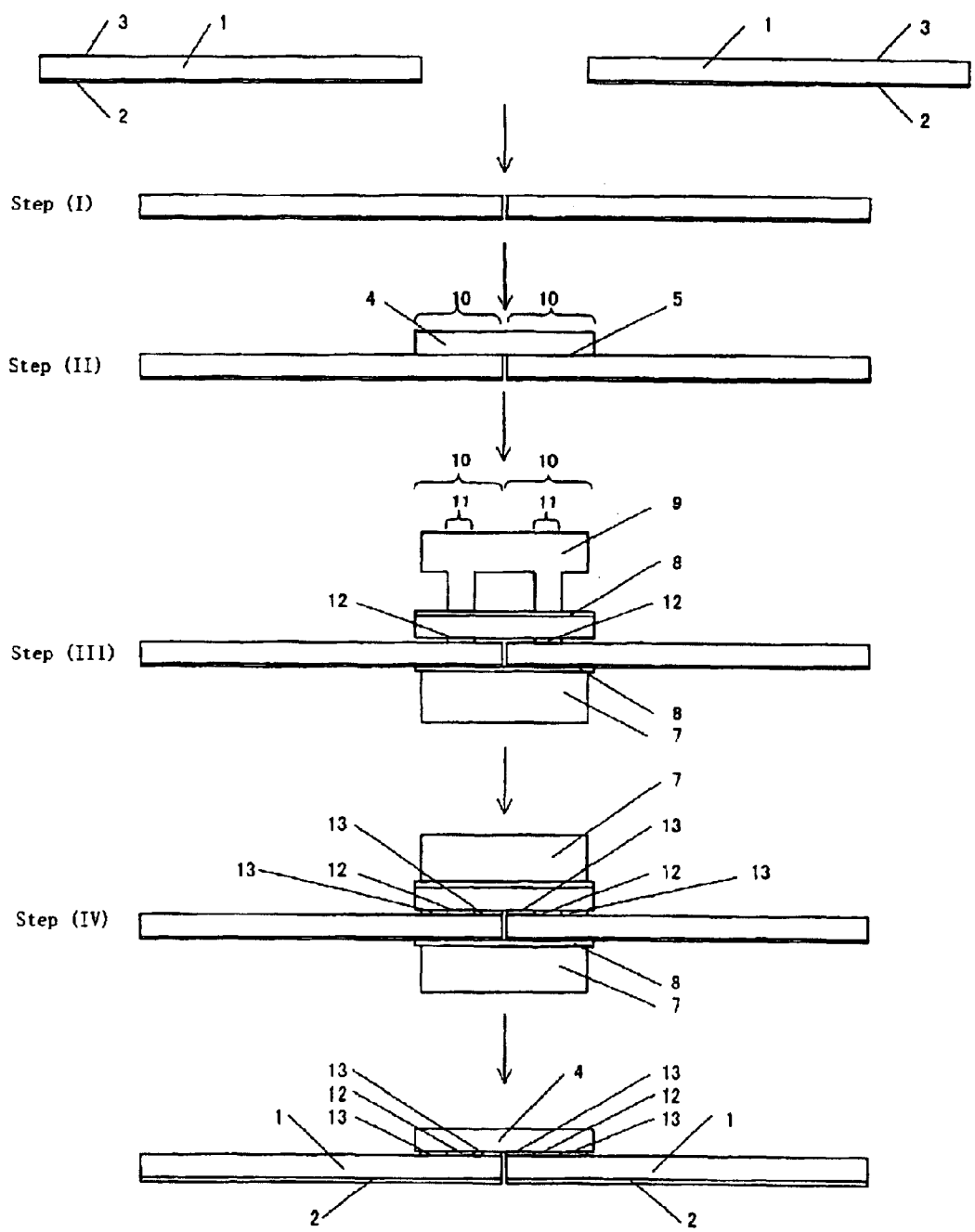
FIG. 3 (FIG. 3) is a diagram showing another example of the process for joining films (A), each denoted as component 1 in this figure, according to the film joining method of the present invention.

In the joining method of the present invention, the two films (A), each denoted as component 1 in the above figures, having a hydrophilized surface at their single surface are disposed to align the hydrophilized surfaces so as to butt each one end portion; a single film (B), denoted as component 4 in the above figures, is overlaid on the films (A) on a side of non-hydrophilized surface of the films so as to bridge the butting portion, and the overlapping portion (c1)5, denoted as component 5 in FIG. 2 and FIG. 3, is hot-pressed to join the two films (A).

It is preferable to hot-press the overlapping portion (c1)5, denoted as component 5 in FIG. 2 and FIG. 3, at a temperature ranging from −30° C. to +20° C. below or above the melting point of a resin constituting the films (A), each denoted as component 1 in the above figures, and the film (B), denoted as component 4 in the above figures. The heating temperature for hot-pressing is more preferably from −15° C. to +20° C., more preferably, from −20° C. to +10° C., further more preferably, from −15° C. to +50° C. The most preferable range is from 0° C. to +5° C. below or above the melting point of the resin constituting the films.

It is also preferable that the central portion (c3)11, denoted as component 11 in FIG. 3, of a part of film (B), denoted as component 4 in the above figures, which is overlaid on either film (A), denoted as component 1 in the above figures, in the overlapping portion (c1)5, denoted as component 5 in FIG. 2 and FIG. 3, and the central portion (c3)11 of a part of film (B), which is overlaid on the other film (A) in the overlapping portion (c1)5, are hot-pressed at a temperature ranging from −5° C. to +20° C. below or above the melting point of the resin constituting the films (A) and the film (B), and then, the overlapping portion (c1)5 is hot-pressed at a temperature ranging from −30° C. to −5° C. below the melting point of the resin.

FIG. 3 shows another example of the process for joining the films (A), each denoted as component 1, according to the present invention. In the same manner as m FIG. 2, an overlapping portion (c1)5, denoted as component 5, is formed in Step (D and Step (II). Then, in Step (III) the central portion (c3)11, denoted as component 11, of each overlapping portion (c2)10, denoted as component 10, wherein each part of film (B), denoted as component 4, overlaps each part of the films (A), is hot-pressed by using a comb type upper heater 9, at a temperature ranging from −5° C. to +20° C. below or above the resin constituting the films, to melt-bond these films (A) and (B).

Then, in Step (IV), the overlapping portion (c1)5 is hot-pressed at a temperature ranging from −30° C. to −5° C. below the melting point of the resin by using upper and lower heaters 7 to melt-bond the portion other than the central portions (c3)11. Hereinbelow, the central portions (c3)11, melt-bonded at a temperature ranging from −5° C. to +20° C. below or above the melting point, is referred to as high temperature melt-bonding portions 12, and the portions melt-bonded at a temperature ranging from −30° C. to −5° C. below the melting point, is referred to as low temperature melt-bonding portions 13.

The heating temperature for the central portions (c3)11 is preferably from 0° C. to +10° C., more preferably, from 0° C. to +5° C., with respect to the melting point of the resin.

It is preferable to use the comb type upper heater 9 to hot-press the central portions (c3)11. Step (III) and Step (IV) may be reversed in the order. In this case, the entirety of the overlapping portion (c1)5 is first melt-bonded at a low temperature, and then, the central portions (c3)11 become high temperature melt-bonding portions.

Further, after the films are hot-pressed for melt-bonding, a step for cooling the melt-bonded films (A), (B) may be inserted. For example, air cooling and a cooling plate may be mentioned. The insertion of the cooling step improves further the facilitation of releasing between the films (A) and the releasing sheet (or a transferring belt).

Figure 4:
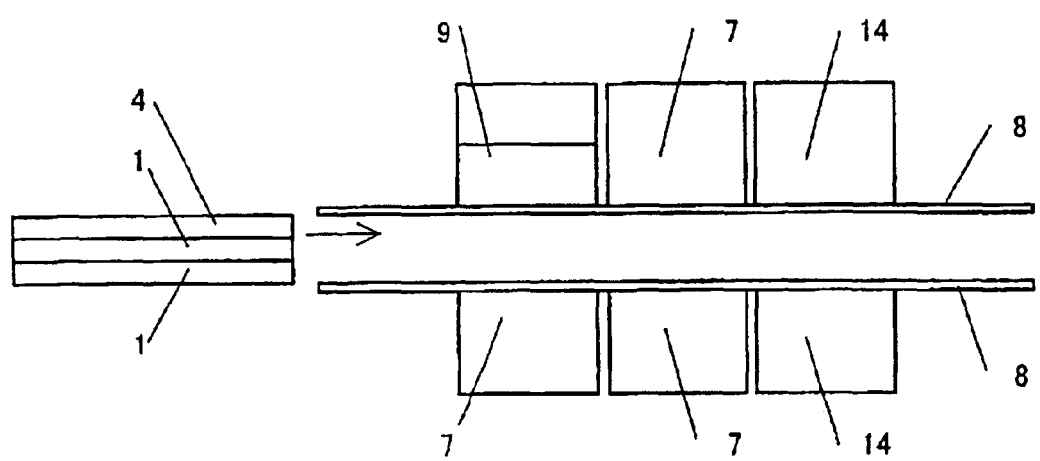
FIG. 4 (FIG. 4) is a cross-sectional view of a hot-pressing portion of a hot-pressing machine used in a step in FIG. 3.

FIG. 4 is a diagrammatical cross-sectional view of the hot-pressing portion of a hot-pressing machine used in a step shown in FIG. 3. The hot-pressing portion comprises a pair of comb type upper heater 9 and heaters 7 which are used to hot-press the central portions (c3)11, each denoted as component 11 in FIG. 3, at a temperature ranging from −5° C. to +20° C. below or above the melting point of the resin, a pair of heaters 7 for hot-pressing the entirety of the overlapping portion at a temperature ranging from −30° C. to −5° C. below the melting point of the fluororesin, and a cooling plates 14, which are arranged successively from the direction of transferring the films. In a hot-pressing step, the films are transferred between releasing sheets 8. Although the applicable pressure in the hot-pressing step may be a pressure of the heater's own weight, a load may be applied to increase the pressure. The pressure is preferably from 0.01 to 10 MPa, more preferably, from 0.1 to 1 MPa.

The film (B), denoted as component 4 in the above figures, may be a film having a non-hydrophilized surface at both surfaces, or may be a film having a hydrophilized surface at its a single surface. When the film having a hydrophilized surface at a single surface is used, the hot-pressing is conducted to oppose the hydrophilized surfaces of the film (B) and the films (A), each denoted as component 1 in the above figures. The film (B) is preferably a film having a non-hydrophilized surface at both surfaces.

The width of each film (A) is preferably from 50 to 250 cm, more preferably from 110 to 160 cm because such width is the standardized width of a covering material for agricultural use. The thickness of the film (A) is preferably from 10 to 300 $\mu$m, more preferably from 50 to 100 $\mu$m because such range of thickness provides an excellent strength and excellent thermal conduction at the time of heating.

The width of the film (B) is preferably from 2 to 10 cm, more preferably, from 2.5 to 6 cm, most preferably, from 3 to 5 cm because such range of thickness allows using a compact hot-pressing apparatus. The thickness of the film (B) is preferably from 30 to 300 $\mu$m, more preferably from 100 to 150 $\mu$m because such range of thickness provides a sufficient strength and excellent thermal conduction at the time of heating.

The width of the overlapping portion of the film (B) and the films (A) is preferably from 1 to 8 cm, more preferably from 1.5 to 6 cm, most preferably from 2 to 4 cm in total. Further, the width of the overlapping portion of the film (B) to either film (A) is preferably from 0.5 to 4 cm, more preferably, from 0.75 to 3 cm, most preferably, from 1 to 2 cm.

The width of the melt-bonding portion of the film (B) to the two films (A) is preferably from 1 to 8 cm, more preferably, from 1.5 to 6 cm, most preferably, from 2 to 4 cm in total. Further, the width of the melt-bonding portion of the film (B) to either film (A) is preferably from 0.5 to 4 cm, more preferably, from 0.75 to 3 cm, most preferably, from 1 to 2 cm. Such range of width provides a sufficient melt-bonding strength and allows using a compact hot-pressing apparatus.

It is preferable that the film (B) and the films (A) are hot-pressed for melt-bonding at the entire area of the overlapping portion (c1). Further, it is preferable that the film (B) is hot-pressed so that portions having a predetermined width in opposing end portions of the film (B) are not melt-bonded. Further, it is more preferable that the hot-pressing is conducted so that there exist a non-melt-bonded portion having a predetermined width from the butting portion of each film (A) and non-melt-bonded portions having a predetermined width at both sides of the film (B) as shown in FIG. 1. The width of the non-melt-bonded portion of the both sides of the film (B) and the butting portion of each film (A) is preferably from 0.1 to 10 mm, more preferably, from 0.3 to 5 mm, most preferably, from 0.5 to 3 mm.

In the present invention, a wide film having a width of 1 to 150 m can be obtained by joining two or more films (A), by repeating at least once the above-mentioned film joining method. A wide film having a width of 8 to 60 m is preferred because of its excellent handling properties or the like.

In the present invention, the covering material for agricultural use is formed by using preferably a wide film having a width of from 1 to 150 m, more preferably, a wide film having a width of from 8 to 60 m.

The films (A) and the film (B) in the present invention are preferably a fluororesin film or a polyolefin film.

The fluororesin film may, for example, be a film made of ETFE, a tetrafluoroethylene/perfluoro(alkyl vinyl ether) copolymer (hereinbelow, referred to as PFA), a tetrafluoroethylene/hexafluoropropylene copolymer (hereinbelow, referred to as FEP), polychlorotrifluoroethylene (CTFE), polyvinylidene fluoride (PVDF), or polyvinyl fluoride. Preferably, it is a film made of ETFE, PFA or FEP, more preferably, of ETFE.

ETFE is preferably comprised of a copolymer of tetrafluoroethylene(hereinbelow, referred to as TFE) and ethylene(hereinbelow, referred to as E) and a copolymer of TFE, E and other monomer.

The other monomer may, for example, be a fluoroolefin such as chlorotrifluoroethylene, hexafluoropropylene, perfluoro(alkyl vinyl ether), a fluoroolefin such as vinylidene fluoride, a polyfluoroalkylethylene such as $CH_2=CHR^f$ (wherein $R^f$ represents a polyfluoroalkyl group having from 1 to 8 carbon atoms, the same definition is used below) or $CH_2=CFR^f$, or a polyfluoroalkyl trifluorovinyl ether such as $CF_2=CFOCH_2R^f$. These monomers may be used alone or in combination of two or more of them.

In particular, $CH_2=CHR^f$ is preferred wherein $R^f$ is preferably a perfluoroalkyl group having from 3 to 6 carbon atoms, and $C_4F_9$ is most preferable.

As the composition of ETFE, the molar ratio of the polymerized unit based on TFE/the polymerized unit based on E is preferably from 70/30 to 30/70. It is preferably from 65/35 to 40/60, most preferably, from 60/40 to 45/55.

When it contains the polymerized unit based on the other comonomer, the content of the polymerized unit based on the other comonomer is preferably from 0.01 to 30 mol % per the total number of mols of the polymerized units based on TFE and ethylene. It is more preferably from 0.05 to 15 mol %, and most preferably from 0.1 to 10 mol %.

The polyolefin film in the present invention may, for example, be a film made of a polyethylene, an ethylene/vinyl acetate copolymer, a polypropylene or an ethylene/propylene copolymer, or a film made of a laminate comprising a polyethylene and an ethylene/vinyl acetate copolymer. It is preferably a film made of a polyethylene or an ethylene/vinyl acetate copolymer, or a film made of a laminate comprising a polyethylene and an ethylene/vinyl acetate copolymer, more preferably, a film made of a polyethylene or an ethylene/vinyl acetate copolymer.

As the method for forming a hydrophilized surface in order to form the film (A) having a hydrophilized surface at its single surface used in the present invention, there are a wet method and a dry method. The wet method may be a method for coating a solution of hydrophilic substance with a roller, a method for coating the solution with a spray, a method for coating the solution with a blush or a method for coating the solution with a coating equipment. Preferably, the method for coating the solution of hydrophilic substance with a coating equipment or the method for coating the solution with a spray is used.

The dry method may be a sputtering method, a vacuum deposition method, a CVD method or an ion plating method, using a hydrophilic substance. Preferably, the sputtering method for sputtering a hydrophilic substance is used because it increases productivity and maintains a hydrophilic effect for a long time.

The hydrophilic substance may, for example, be a colloid sol of inorganic material such as $SiO_2$ or $Al_2O_3$, polyvinyl alcohol, a hydrophilic resin such as an acrylic acid or an oxide of metal such as Si, Sn, Ti, Nb, Al or Zn.

In particular, it is preferable to use a sputtering method or sputtering an oxide of metal such as Si, Sn or Ti. In this case, it is further preferable to use an oxide of metal such as Si and/or Sn.

The covering material for agricultural use of the present invention has an excellent anti-drop property because the above-mentioned hydrophilization is carried out. In an agricultural house formed by setting-up the covering material for agricultural use of the present invention, water drops flow easily even in a case that moisture in the house condenses on the inner surface of the house made of the film whereby there is little influence to the growth of crops due to the falling of water drops to the crops.

Further, in the film joining method of the present invention, since the overlapping portion can sufficiently be melt-bonded, there is little possibility of causing the peeling of the melt-bonding portion, and the invasion of water and dust into the agricultural house can be prevented.

A wide film having a width of from 1 to 150 m formed by joining films according to the joining method of the present invention can preferably used for a covering material for agricultural use. Further, it can also be applied to, for example, material for a tent, a bag or a waterproof sheet.

Now, the present invention will be described in further detail with reference to Examples. However, it should be understood that the present invention is by no means restricted to such specific examples.

EXAMPLE 1

Two ETFE films (a1) (manufactured by Asahi Glass Company, Limited, AFLEX® film, melting point: 260° C.) having a thickness of 60 μm and a width of 1 m, each having a single surface as a hydrophilized surface composed of a $SiO_2/SnO_2$ (50/50 in mass percentage) having a thickness of 0.05 μm formed by a sputtering method, were prepared. These films were disposed to align non-hydrophilized surfaces so as to butt each one end portion. Then, an ETFE film (b1) (manufactured by Asahi Glass Company, Limited, AFLEX® film) having a thickness of 150 μm and a width of 3.3 cm and having no hydrophilized surface was overlaid on the two ETFE films (a1) at a side of non-hydrophilized surface so as to bridge the butting portion. The width of the overlapping portion at each part of the two ETFE films (a1) was 1.65 cm. Releasing sheets were overlaid on opposing surfaces of the overlapping portion and the overlapping portion was pressed and melt-bonded at 260° C. by using a hot-pressing machine having heaters of 3 cm wide. It was found that each portion having a width of 1.5 mm extending from both ends of the ETFE film (b1) was not melt-bonded to each of the ETFE films (a1) and the central portion having a width of 3 cm of the film (b1) was melt-bonded. The peel strength of the melt-bonded portion was 2.0 kg/10 mm which showed a strong melt-bonding strength.

EXAMPLE 2

Two ETFE films (a2) (manufactured by Asahi Glass Company, Limited, AFLEX® film, melting point: 260° C.) having a thickness of 100 μm and a width of 1 m, each having a single surface as a hydrophilized surface composed of a $SiO_2/SnO_2$ (50/50 in mass percentage) having a thickness of 0.05 μm formed by a sputtering method, were prepared. These films were disposed to align non-hydrophilized surfaces so as to butt each one end portion. Then, the same ETFE film (b1) as used in Example 1 was overlaid on the two ETFE films (a2) at a side of non-hydrophilized surface so as to bridge the butting portion. The width of the overlapping portion at each part of the two ETFE films (a2) was 1.65 cm. Releasing sheets were overlaid on opposing surfaces of the overlapping portion and the overlapping portion was pressed and melt-bonded at 265° C. by using a hot-pressing machine having heaters of 3 cm wide. It was found that each portion having a width of 1.5 mm extending from both ends of the ETFE film (b1) was not melt-bonded to each of the ETFE films (a2) and the central portion having a width of 3 cm of the film (b1) was melt-bonded. The peel strength of the melt-bonded portion was 2.5 kg/10 mm which showed a strong melt-bonding strength.

EXAMPLE 3

Two ETFE films (a3) (manufactured by Asahi Glass Company, Limited, AFLEX® film, melting point: 260° C.) having a thickness of 60 μm and a width of 1 m, each having a single surface as a hydrophilized surface comprising a layer of $SiO_2/Al_2O_3$ having a thickness of 0.3 μm formed by coating a mixed solution of a $SiO_2$ and $Al_2O_3$ sol with a coating equipment, were prepared. These films were disposed to align non-hydrophilized surfaces so as to butt each one end portion. Then, the same ETFE film (b1) as used in Example 1 was overlaid on the two ETFE films (a3) at a side of non-hydrophilized surface so as to bridge the butting portion. The width of the overlapping portion at each part of the two ETFE films (a3) was 1.65 cm. Releasing sheets were overlaid on opposing surfaces of the overlapping portion and the overlapping portion was pressed and melt-bonded at 260° C. by using a hot-pressing machine having heaters of 3 cm wide. It was found that each portion having a width of 1.5 mm extending from both ends of the ETFE film (b1) was not melt-bonded to each of the ETFE films (a3) and the central portion having a width of 3 cm of the film (b1) was melt-bonded. The peeling strength of the melt-bonded portion was 2.0 kg/10 mm which showed a strong melt-bonding strength.

COMPARATIVE EXAMPLE 1

The same two ETFE films (a1) as used in Example 1 were prepared and the hydrophilized surface of either ETFE film (a1) and the non-hydrophilized surface of the other ETFE film (a1) were overlapped each other with a width of 3 cm from each end portion of the films. Releasing sheets were overlaid on opposing surfaces of the overlapping portion and the overlapping portion was pressed and melt-bonded at 260° C. by using a hot-pressing machine having heaters of 3 cm wide. The peeing strength of the melt-bonded portion was 0.4 kg/10 mm which showed a insufficient melt-bonding strength.

COMPARATIVE EXAMPLE 2

The same two ETFE films (a2) as used in Example 2 were prepared and the hydrophilized surface of either ETFE film (a2) and the non-hydrophilized surface of the other ETFE film (a2) were overlapped each other with a width of 3 cm from each end portion of the films. Releasing sheets were overlaid on opposing surfaces of the overlapping portion and the overlapping portion was pressed and melt-bonded at 260° C. by using a hot-pressing machine having heaters of 3 cm wide. The peeing strength of the melt-bonded portion was 0.4 kg/10 mm which showed an insufficient melt-bonding strength.

EXAMPLE 4

Two polyolefin films (a4) (manufactured by Mitsubishi Chemical MKV Company, super solar anti-drop film) having a thickness of 100 m and a width of 1 m, each having a single surface as a hydrophilized surface were prepared. These films were disposed to align non-hydrophilized surfaces so as to butt each one end portion. Then, a polyolefin film (b2) having a thickness of 150 μm and a width of 3.3 cm having no hydrophilized surface was overlaid on the two polyolefin films (a4) at a side of non-hydrophilized surface so as to bridge the butting portion. The width of the overlapping portion at each part of the two polyolefin films (a4) was 1.65 cm. Releasing sheets were overlaid on opposing surfaces of the overlapping portion and the overlapping portion was pressed and melt-bonded at 120° C. by using a hot-pressing machine having heaters of 3 cm wide. It was found that each portion having a width of 1.5 mm extending from both ends of the polyolefin film (b2) was not melt-bonded to each of the polyolefin films (a4) and the central portion having a width of 3 cm of the film (b2) was melt-bonded. The peeling strength of the melt-bonded portion was 2.0 kg/10 mm which showed a strong melt-bonding strength.

EXAMPLE 5

An ETFE film (b1) having a single surface as a hydrophilized surface was overlaid on two ETFE films (a1) in the same manner as Example 1. The width of the overlapping portion at each part of the two ETFE films (a1) was the same. Releasing sheets were overlaid on vertically opposing surfaces of the overlapping portion and the overlapping portion was hot-pressed at 260° C. with a comb type upper heater 9 to form two high temperature melt-bonding portions.

Figure 5:
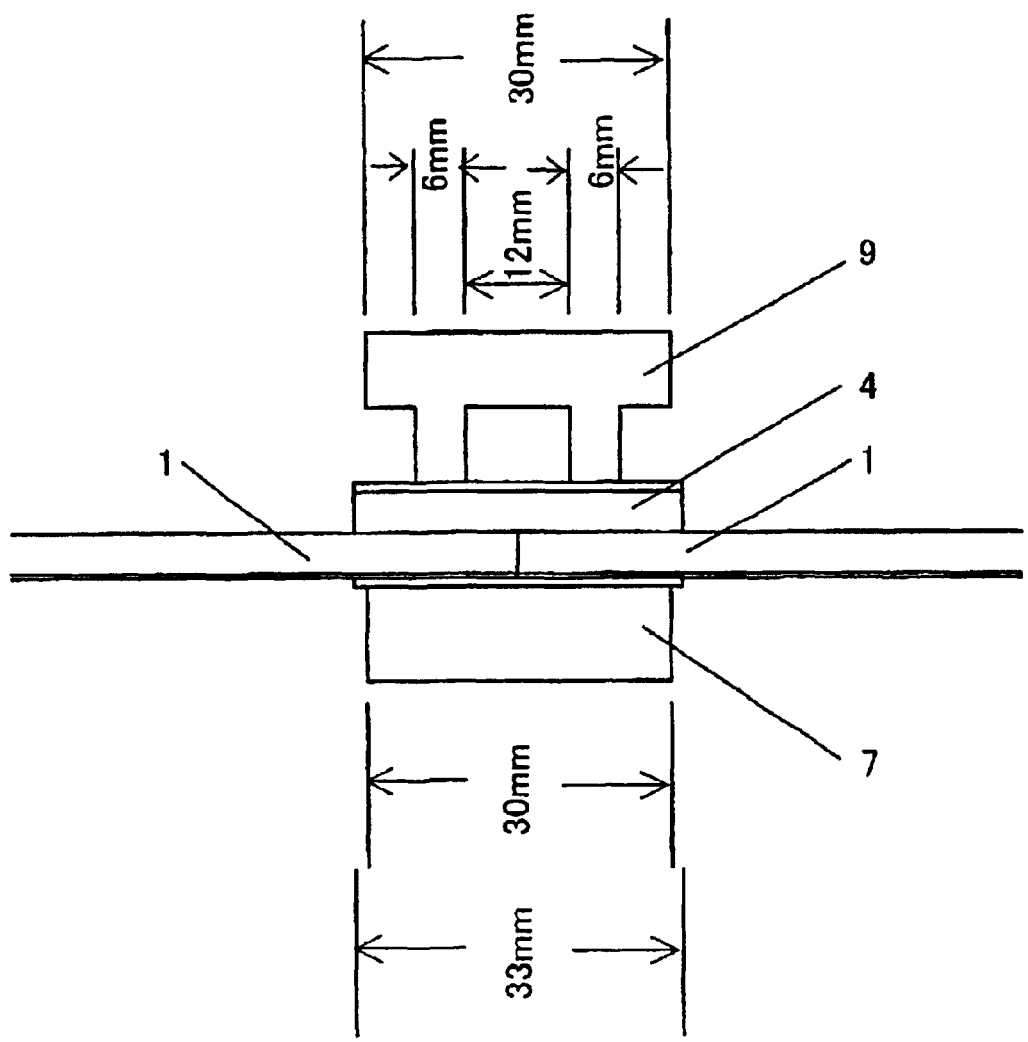
FIG. 5 (FIG. 5) is a diagrammatical sectional view of a comb type upper heater, a lower heater and films (A), each denoted as component 1 in this figure, and a film (B), denoted as component 4 in this figure, to be hot-pressed by the heaters.

FIG. 5 is a diagrammatical cross-sectional view of the comb type upper heater 9, a lower heater 7 and the films (A), each denoted as component 1, and the film (B), denoted as component 4, to be bonded by hot-pressing. In the comb-type upper heater 9, the dimensions of the central portion and hot-pressing portions were 12 mm and 6 mm respectively. The width of the comb type upper heater 9 and the width of the lower heater 7 were 30 mm. These heaters 9, 7 were arranged so as to meet the center of width of the heaters to the butting portion of the ETFE films (a1).

Then, the upper and lower heaters each having a width of 30 mm were arranged so as to meet the center of width of these heaters to the center of the butting portion of the two films (a1) and the films (A)(B) were hot-pressed at 250° C. which was lower than that for the high temperature melt-bonding portions. Thus, there are obtainable two low temperature melt-bonding portions at both outer sides of the high temperature melt-bonding portions melt-bonded at 260° C. As a result, a joined film wherein each portion having a width of 1.5 mm extending from both ends of the ETFE film (b1) was not bonded to each of the ETFE films (a1) and the central portion having a width of 3 cm of the film (b1) was melt-bonded to the films (a1), was obtained. The peeing strength of the melt-bonding portion was 2.1 kg/10 mm (width) which showed a strong melt-bonding strength. The tear strength was 1.1N which showed a high tear resistance.

EXAMPLE 6

An ETFE film (b1) was overlaid on two ETFE films (a2) having a single surface as a hydrophilized surface in the same manner as Example 2. The width of the overlapping portion at each part of the two ETFE films (a2) was the same. The overlapping portion was hot-pressed in the same manner as Example 5 to form high temperature melt-bonding portions melt-bonded at 260° C. and low temperature melt-bonded portions melt-bonded at 250° C. As a result, a joined film wherein each portion having a width of 1.5 mm extending from both ends of the ETFE film (b1) was not bonded to each of the ETFE films (a2) and the central portion having a width of 3 cm of the film (b1) was melt-bonded to the films (a2) was obtained. The peel strength of the melt-bonded portion was 2.4 kg/10 mm (width) which showed a strong melt-bonding strength. Further, the tear strength was 1.0N which showed a high tear resistance.

EXAMPLE 7

An ETFE film (b1) was overlaid on two ETFE films (a3) having a single surface as a hydrophilized surface in the same manner as Example 3. The width of the overlapping portion at each part of the two ETFE films (a3) was the same. The overlapping portion was hot-pressed in the same manner as Example 5 to form high temperature melt-bonding portions melt-bonded at 260° C. and low temperature melt-bonded portions melt-bonded at 250° C. As a result, a joined film wherein each portion having a width of 1.5 mm extending from both ends of the ETFE films (b1) was not bonded to each of the films (a3) and the central portion having a width of 3 cm of the film (b1) was melt-bonded to the films (a3), was obtained. The peel strength of the melt-bonded portion was 2.1 kg/10 mm (width) which showed a strong melt-bonding strength. The tear strength was 1.1N which showed a high tear resistance.

In accordance with the film joining method of the present invention, a wide film can easily be obtained from films having a hydrophilized surface at their single surface. The obtained wide film has an excellent bonding strength in the melt-bonded portion of the films and an excellent tear strength. Further, the obtained wide film is suitably applicable to a covering material for agricultural use. When the wide film formed according to the film joining method of the present invention is used as the covering material for agricultural use for setting-up an agricultural house, there is little possibility of causing the peeling of the melt-bonded portion and invasion of water or dust into the agricultural house can be prevented. The covering material for agricultural use has an excellent anti-drop property. Since water drops caused by the condensation of water in the house easily flows, the covering material has a good permeability to light and there is little possibility of falling of water drops on crops.

The entire disclosures of Japanese Patent Application No. 2001-381167 filed on Dec. 14, 2001, Japanese Patent Application No. 2002-41770 filed on Feb. 19, 2002 and Japanese Patent Application No. 2002-318203 filed on Oct. 31, 2002 including specifications, claims, drawings and summaries are incorporated herein by reference in their entireties.

What is claimed is:

1. A film-joining method comprising:

adjacently disposing two films, each comprising a hydrophilized surface and a non-hydrophilized surface, end-to-end, overlaying a third film so as to overlap the two films on their non-hydrophilized sides to form an overlapping portion between the two films and the third film, and hot-pressing the overlapping portion of the two films and the third film so as to join the two films and the third film.

2. The joining method according to claim 1, wherein the overlapping portion is hot-pressed at a temperature ranging from −30° C. to +20° C. below or above the melting point of a resin constituting the two films and the third film.

3. The joining method according to claim 1, wherein the overlapping portion is hot-pressed using an upper heater and a lower heater.

4. The joining method according to claim 1, wherein central portions of each respective half portion of the overlapping portion are first hot-pressed using an upper heater and a lower heater at a temperature ranging from −5° C. to +20° C. below or above the melting point of a resin, constituting the two films and the third film.

5. The joining method according to claim 1, wherein central portions of each respective half portion of the overlapping portion are first hot-pressed, and then the overlapping portion is subsequently hot-pressed, using an upper heater and a lower heater at a temperature ranging from −30° C. to −5° C. below the melting point of a resin, constituting the two films and the third film.

6. The joining method according to claim 1, wherein central portions of each respective half portion of the overlapping portion are hot-pressed at a temperature ranging from 0° C. to +10° C. below or above the melting point of a resin, constituting the two films and the third film.

7. The joining method according to claim 1, wherein central portions of each respective half portion of the overlapping portion are hot-pressed using a comb-type heater.

8. The joining method according to claim 1, wherein the hot-pressing of the two films and the third film takes place at a pressure of 0.01 to 10 MPa.

9. The joining method according to claim 1, further comprising cooling the two films and the third film.

10. The joining method according to claim 1, wherein the two films and the third film are either fluororesin films or polyolefin films.

11. The joining method according to claim 1, wherein the two films and the third film are ethylene/tetrafluoroethylene copolymer films.

12. The joining method according to claim 1, wherein the width of each of the two films is from 50 to 250 cm.

13. The joining method according to claim 1, wherein the width of the third film is from 2 to 10 cm.

14. The joining method according to claim 1, wherein the hydrophilized surfaces of the two films are formed by sputtering a metal oxide.

15. The joining method according to claim 1, wherein the hydrophilized surfaces of the two films are formed by sputtering an oxide of Si and/or Sn.

16. The joining method according to claim 1, wherein the hydrophilized surfaces of the two films are formed by coating a mixed solution of $SiO_2$ and $Al_2O_3$ sols.

17. The joining method according to claim 1, wherein the thickness of the third film is 30 to 300 $\mu$m.

18. A wide film having a width of 1 to 150 m formed by joining two or more films by repeating the joining method described in claim 1.

19. A wide film obtained using the joining method of claim 1, having a peel strength in the melt-bonded portions of about 2.0 kg/10 mm.

20. A covering material for agricultural use, which comprises the wide film of claim 18.

* * * * *